(12) United States Patent
Sawayanagi

(10) Patent No.: US 6,511,029 B2
(45) Date of Patent: Jan. 28, 2003

(54) BRACKET FOR MOUNTING AN ACCESSORY ON VEHICLE BODY

(75) Inventor: Masahiro Sawayanagi, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/805,119

(22) Filed: Mar. 14, 2001

(65) Prior Publication Data

US 2001/0022336 A1 Sep. 20, 2001

(30) Foreign Application Priority Data

Mar. 15, 2000 (JP) ........................................ 2000-072376

(51) Int. Cl.[7] .............................................. A47B 96/00
(52) U.S. Cl. ................................ 248/224.8; 248/231.9; 296/97.9
(58) Field of Search ............................ 296/97.9; 439/34, 439/36; 248/289.11, 231.9, 220.22, 223.31, 224.8, 222.41

(56) References Cited

U.S. PATENT DOCUMENTS

| | | | | |
|---|---|---|---|---|
| 5,857,728 A | * | 1/1999 | Crotty, III | |
| 5,868,370 A | * | 2/1999 | Nivet | |
| 5,975,617 A | * | 11/1999 | Jacquemin et al. | |
| 6,003,928 A | * | 12/1999 | Curtindale | |
| 6,007,136 A | * | 12/1999 | Zittwitz et al. | |
| 6,250,708 B1 | * | 6/2001 | Kurachi | |

FOREIGN PATENT DOCUMENTS

JP   2001-105950 A  *  4/2001

* cited by examiner

Primary Examiner—Korie Chan
(74) Attorney, Agent, or Firm—Finnegan, Henderson, Farabow, Garrett, & Dunner, L.L.P.

(57) ABSTRACT

This mounting bracket is used for fixing an accessory to a panel of a vehicle body provided with an auxiliary panel and comprises a panel side bracket (5), a visor side bracket (9) and a cover (10). The cover has a lock member having temporary fixing pawls (27) for fixing the cover (10) to the visor side bracket (9) temporarily. The visor side bracket (9) has a lock member (17) insertion hole (18) allowing a front end side portion of the lock member to pass through to face a bracket opposing face (9b) on an opposite side to a cover mounting face (9a). The temporary fixing pawls (27) are fixed to an opening peripheral portion of the lock member insertion hole in the bracket opposing face (9b) so that the cover (10) is fixed to the second bracket (9) temporarily.

13 Claims, 9 Drawing Sheets

BRACKET FOR MOUNTING AN ACCESSORY ON VEHICLE BODY

BACKGROUND OF THE INVENTION

The present invention relates to a bracket for mounting an accessory such as a sun visor for vehicle, on a vehicle panel and more particularly to a bracket for mounting an accessory on a vehicle body, having an excellent mounting performance and capable of eliminating a connector engagement failure.

For example, a sun visor is provided on a top end of a front window in front of a driver's seat or passenger seat of a vehicle. Some type of the sun visor has a vanity mirror and other type of the sun visor has a lamp for allowing the vanity mirror to be used at night as well.

As shown in FIG. 1, the sun visor 101 having such a lamp has a bracket 102 for fixing the sun visor 101 to a vehicle body at a front end of a fixing shaft 103 and by bolting the bracket 102 to an inner panel 104 in a vehicle compartment, the sun visor 101 is fixed.

A method for fixing the sun visor 101 to the inner panel 104 will be described below. As shown in FIGS. 1, 2, first, wire harness is introduced into a vehicle compartment through a hole portion 106 formed in an inner panel 104 at a top end of a front window 105 and a connector provided at an end of the wire harness is coupled with a connector 110 provided at an end of wire 109 introduced from the bracket 102. Coupling of these connectors 108, 110 is carried out manually by a skilled operator.

Next, the coupled connectors 108, 110 and the wire harness 107 are accommodated in a space portion 112 between the inner panel 104 and an outer panel 111 through a hole 106 formed in the inner panel 104 and consequently, the sun visor 101 is mounted. That is, as shown in FIG. 3, the connectors 108, 110 and the wire harness 107 are accommodated in the space portion 112 and grommet screws 113 formed on the bracket 102 are inserted into bracket mounting holes (see FIG. 1) formed in the inner panel 104 and then, the bracket 102 is pressed into the inner panel 104.

Next, as shown in FIG. 4, a screw 115 is inserted into a center hole of each of the cylindrical grommet screws 113 and tightened so as to fix the bracket 102 onto the inner panel 104. After tightening of the screw is completed, a cover 117 for covering the screw 115 in the bracket 102 is mounted on the bracket 102. Through such a process, the sun visor 101 can be fixed to the inner panel 104.

However, because the cover 117 is not mounted until the connectors 108, 110 are coupled with each other and the bracket 102 is fixed to the inner panel 104, the engagement between the connectors 108 and 110 cannot be seen after the mounting is completed. That is, whether or not the connectors 108, 110 are engaged with each other properly cannot be identified. If the engagement is improper, it is necessary to remove the cover 117 and bracket 102 and then recouple the connectors 108, 110.

Further, because the cover is not mounted until the bracket 102 is fixed to the inner panel 104, the cover 117 may be not always mounted properly and additionally, these components need to be controlled carefully for any part not to be missing.

SUMMARY OF THE INVENTION

The present invention has been achieved to solve the above described problem. It therefore is an object of the invention to provide a holding means capable of fixing an article by a single action while simplifying mounting procedure and eliminating connector coupling failure.

According to a first aspect of the present invention, a mounting bracket for fixing an accessory to a panel provided with an auxiliary panel comprises a first bracket, a second bracket having a second connector to be joined to the first bracket and a fixing means for fixing the brackets to the panel, and a cover which is mounted on the second bracket from an opposite side thereof to the side opposing the first bracket, so as to join the first bracket and the second bracket together. Further, a cover has a lock member having temporary fixing pawls for fixing the cover temporarily to the second bracket. The second bracket has a lock member insertion hole, which allows a front end side portion of the lock member to pass through to face a bracket opposing face on an opposite side to the cover mounting face. Temporary fixing pawls are fixed to an opening peripheral portion of the lock member insertion hole in the bracket opposing face, so that the cover is fixed temporarily to the second bracket.

Because the temporary fixing pawls of the lock member provided on the cover are fixed to the opening peripheral portion of the lock member insertion hole, such that the front end side portion of the lock member faces the side of the bracket opposing face through the lock member insertion hole formed in the second bracket, the cover can be fixed temporarily to the second bracket. Consequently, the second bracket and cover can be converted to a module so that these components can be handled as a single part, thereby handling performance of necessary parts being largely improved. Further, the temporary fixing pawls prevent the lock member from being removed from the lock member insertion hole.

According to a second aspect of the present invention, the lock member is provided with step portions which are in contact with a cover mounting face of the second bracket when the cover is fixed temporarily so as to prevent an invasion of the lock member into the lock member insertion hole. Therefore, the lock member is locked in insertion direction and release direction relative to a lock member insertion hole, so that temporary fixing condition of the cover relative to the second bracket is maintained.

According to a third aspect of the present invention, the first bracket is provided with temporary fixing release protrusions, which press temporary fixing release portions formed on the lock member through the lock member insertion hole so as to crush the lock member within an elastic range thereof, so that an engagement between step portions and a cover mounting face is released. Consequently, the second bracket can be joined to the first bracket.

According to a fourth aspect of the present invention, the second bracket, on which the cover is fixed temporarily, is joined to the first bracket fixed to the auxiliary panel preliminarily. As a result, the first connector can be coupled with the second connector easily, thereby preventing a failure of engagement between the connectors effectively.

According to a fifth aspect of the present invention, when the brackets are joined together, the front end side portion of the lock member protruded to the side of the bracket opposing face is elastically restored and returned to its initial state, so that it is fixed to an opening peripheral portion of an escaping hole formed in the first bracket, through which the lock member is to be passed. Therefore, the lock member is prevented from slipping out of the lock member insertion hole.

DESCRIPTION OF THE PREFERRED EMBODIMENT

This embodiment is an application of technical philosophy of the present invention to a bracket for mounting an accessory, such as a sun visor, which is usually provided on a top end of a front window in front of a driver's seat or passenger seat, to a vehicle body. This bracket is so constructed to be capable of being mounted and fixed to the vehicle body easily and securely by a single action.

Structure of a Mounting Bracket

Figure 1:
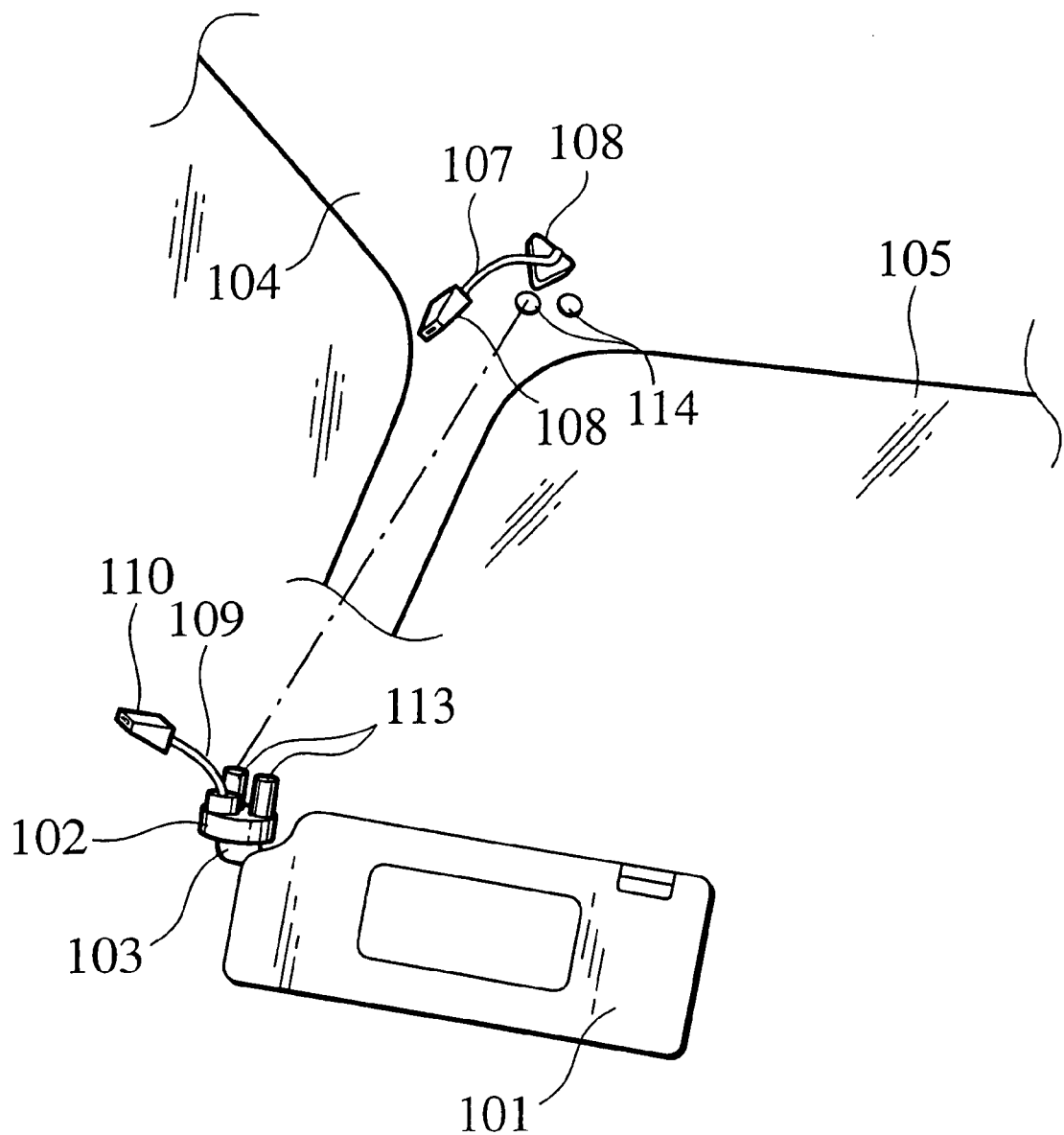
FIG. 1 is a perspective view showing a condition prior to fixing a sun visor to a vehicle body panel using a conventional mounting bracket.
Figure 2:
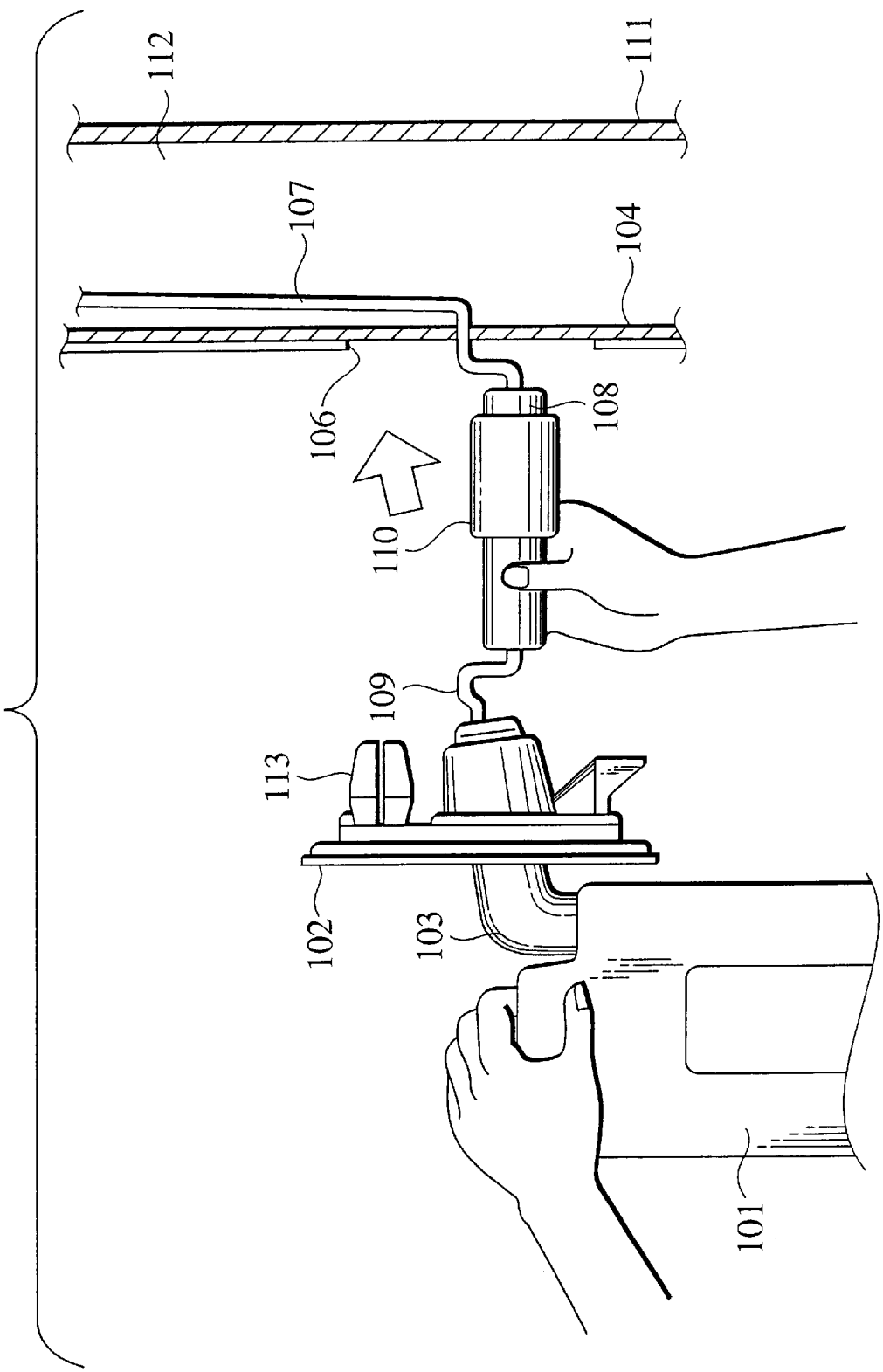
FIG. 2 is a view showing a condition for connecting a connector manually.
Figure 3:
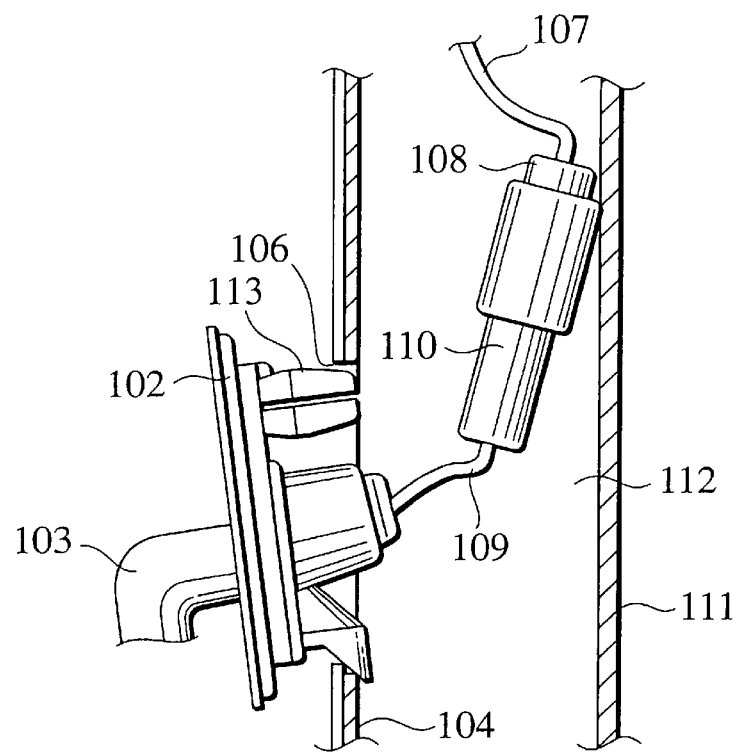
FIG. 3 is a sectional view showing a condition for pushing a bracket into an inner panel after a connected connector is accommodated in a space within the panel.
Figure 4:
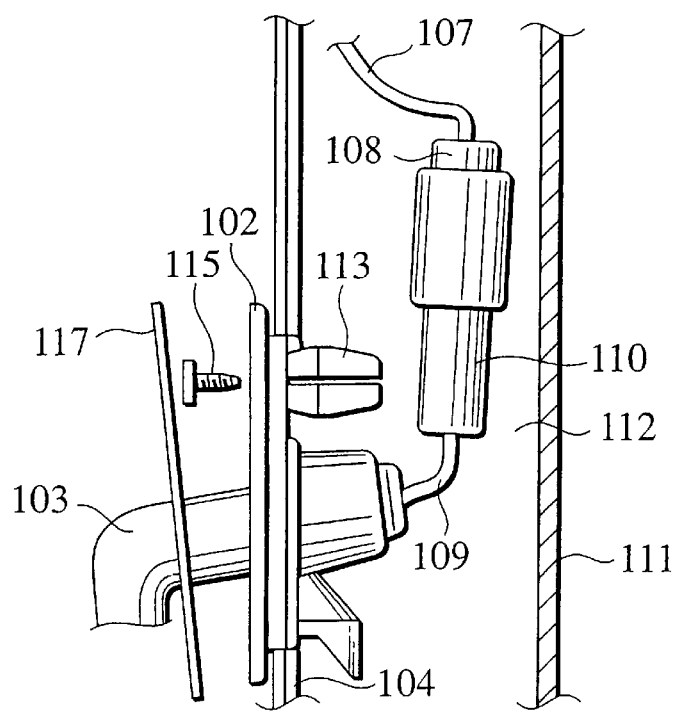
FIG. 4 is a sectional view showing a condition for fixing the bracket to the inner panel with screws.
Figure 5:
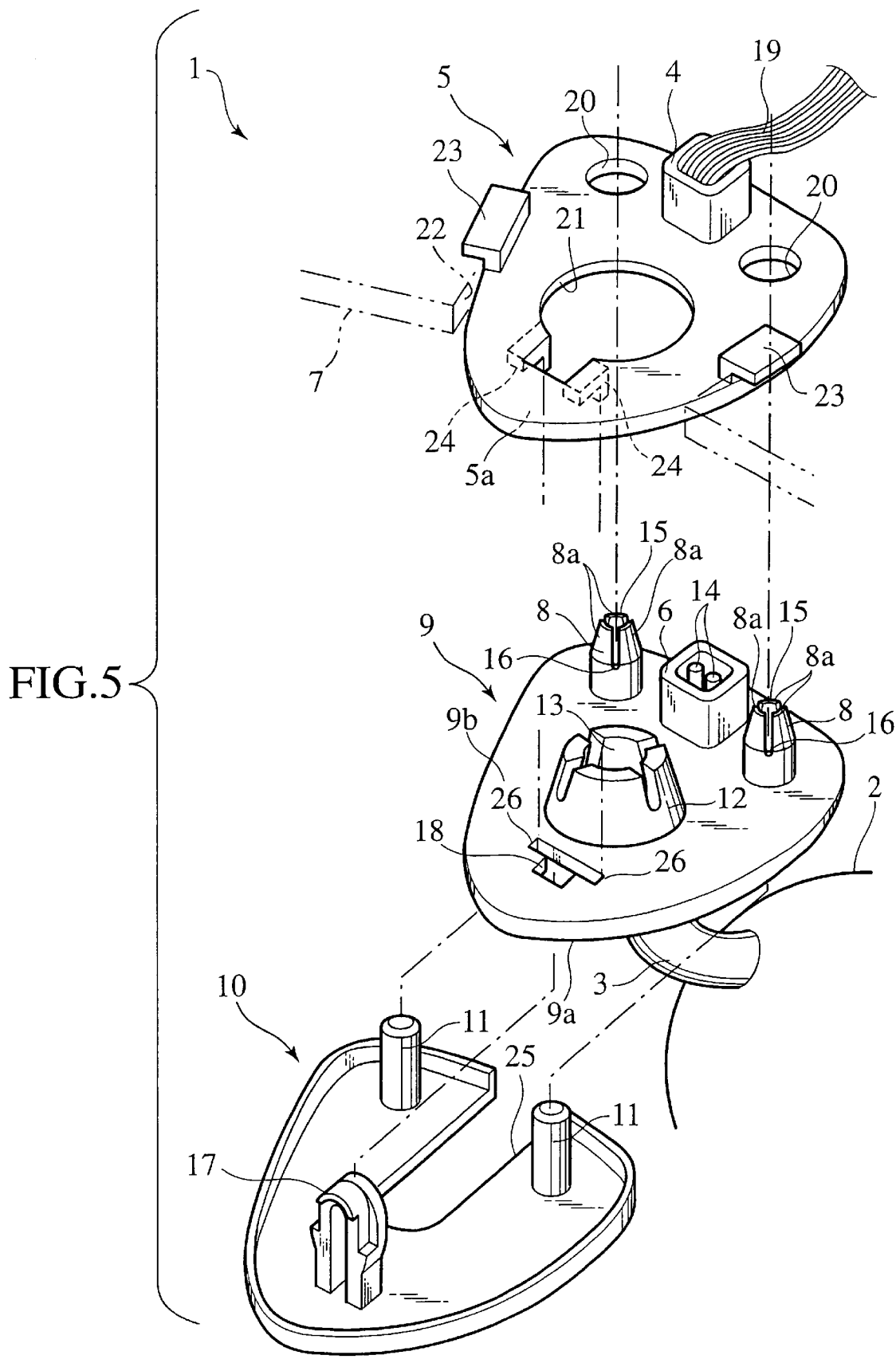
FIG. 5 is a disassembly perspective view of the bracket for mounting an accessory to vehicle body of the embodiment.
Figure 6:
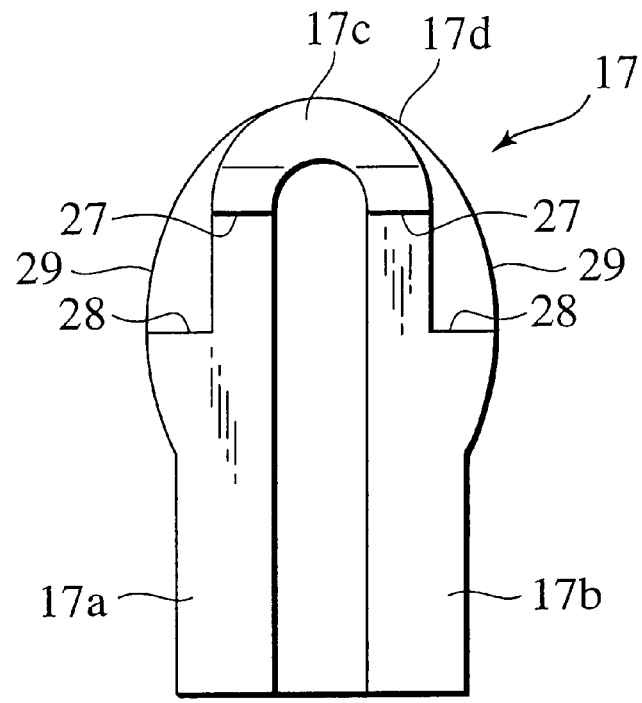
FIG. 6 is an enlarged front view of a lock member.
Figure 7:
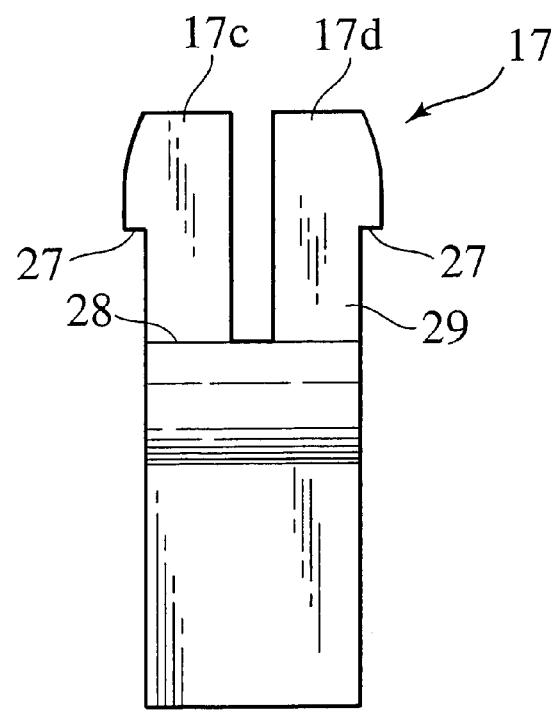
FIG. 7 is an enlarged side view of the lock member.

As shown in FIG. 5, a mounting bracket 1 for an accessory of this embodiment is mounted on a front end of a fixing shaft 3 for supporting a sun visor 2 by a fixing means for fixing the sun visor 2 to an inner panel (not shown) of a vehicle body, on which a roof trim 7 is mounted as an auxiliary panel.

The mounting bracket 1 comprises a panel side bracket 5, which is a first bracket having a male connector portion 4 as a first connector, a visor side bracket 9 as a second bracket containing a female connector portion 6, which is a second connector to be joined to the male connector portion 4 when the visor side bracket is joined to the panel side bracket 5, and cylindrical grommet screws 8, 8, which are inserted into bracket mounting holes (not shown) formed in an inner panel and fixed by the inner panel, and a cover 10 to be attached to the visor side bracket 9.

As shown in FIG. 5, the visor side bracket 9 is joined to the panel side bracket 5 fixed to the roof trim 7, which is an interior material for covering the inner panel such that it is fixed to the inner panel.

As shown in FIG. 5, the visor side bracket 9 has a shaft fixing portion 12 for holding a front end side portion of the fixing shaft 3 provided substantially in the center thereof such that it is protruded. The shaft fixing portion 12 is formed in the form of a cylinder having a shaft fixing hole 13 through which the fixing shaft 13 is to be inserted.

As shown in FIG. 5, the visor side bracket 9 has a female connector portion 6 to be joined to the male connector portion 4 provided on the panel side bracket 5, which will be described later. This female connector portion 6 accommodates terminals 14, 14 attached to front ends of lead wires to be connected to a lamp provided in the sun visor 2. The lead wires are placed from the sun visor 2 to the female connector portion 6 through the fixing shaft 3.

As shown in FIG. 5, the visor side bracket 9 has the grommet screws 8, 8, which are inserted into the bracket mounting holes formed in the inner panel and fixed to the inner panel. The grommet screws 8, 8 are formed in the form of a cylinder each having a center hole 15, through which each of grommet screw protrusions 11, 11 is to be inserted, the grommet screws being formed on the cover 10 described later. Such grommet screws 8, 8 have screw pieces 8a, 8a, 8a, which are present by dividing its cylindrical body to substantially three sections by slits 16 formed therein in the length direction from a front end thereof toward its proximal end.

As shown in FIG. 5, the visor side bracket 9 has a lock member insertion hole 18, through which a lock member 17, which is provided on the cover 10 and will be described later, is to be inserted. The lock member insertion hole 18 is formed substantially in the shape of a convex as viewed in plan and has a size not allowing the lock member 17 to be inserted entirely thereinto only if the cover 10 is pushed into the visor side bracket 9. Release protrusion insertion holes 26, 26, which receive temporary fixing release protrusions 24, 24 formed on the panel side bracket 5, are formed adjacent the lock member insertion hole 18.

As shown in FIG. 5, the panel side bracket 5 is so constructed that when it is fixed to the roof trim 7 and the cover 10 is joined to the visor side bracket 9 fixed temporarily, the male connector 4 is joined to the female connector 6. The panel side connector 5 has the male connector 4, which is to be joined to the female connector 6 provided on the visor side bracket 9. The male connector portion 4 accommodates a mating terminal (not shown) attached to an end of flexible flat cable (FFC) 19 placed in a space between the inner panel and outer panel. If the male connector 4 and female connector 6 are connected to each other, the respective terminals 14 are connected.

As shown in FIG. 5, the panel side bracket 5 has circular hole portions 20, 20, to which the grommet screws 8, 8 are fit loosely, an escaping hole 21 for preventing a contact with the shaft fixing portion 12 and the lock member 17 and trim fixing pawls 23, 23, which are to face the inner panel through an opening 22 formed in the roof trim 7 and fixed on a peripheral portion of the opening 22.

As shown in FIG. 5, the panel side bracket 5 has the temporary fixing release protrusions 24, 24 for releasing an engagement between step portions 28 and a cover mounting face 9a. The step portions face the lock member insertion hole 18 when the cover 10 fixed temporarily to the visor side bracket 9 is pushed into the panel side bracket 5, and presses temporary fixing release portions 29 formed on the lock member 17 so as to crush/distort the lock member 17 within its elastic range. The temporary fixing release protrusions 24, 24 are formed on a bottom face 5a opposing the visor side bracket 9 in the form of a rectangular solid having substantially the same thickness as that of the visor side bracket 9.

As shown in FIG. 5, the cover 10 is mounted on the cover mounting face 9a of the visor side bracket 9 so as to cover the visor side bracket 9. As shown in FIG. 5, this cover 10 has a cutout portion 25 for allowing the fixing shaft 3 to pass. The cutout portion 25 is a cutout groove formed straight from part of an outside edge of the cover 10 up to substantially the center portion thereof. The cover 10 has the lock member 17, which is inserted through the lock member insertion hole 18 when the panel side bracket 5 is joined to the visor side bracket 9 and the front end side portion of which faces a bracket opposing face 9b when the cover 10 is fixed to the visor side bracket 9 temporarily.

Figure 8:
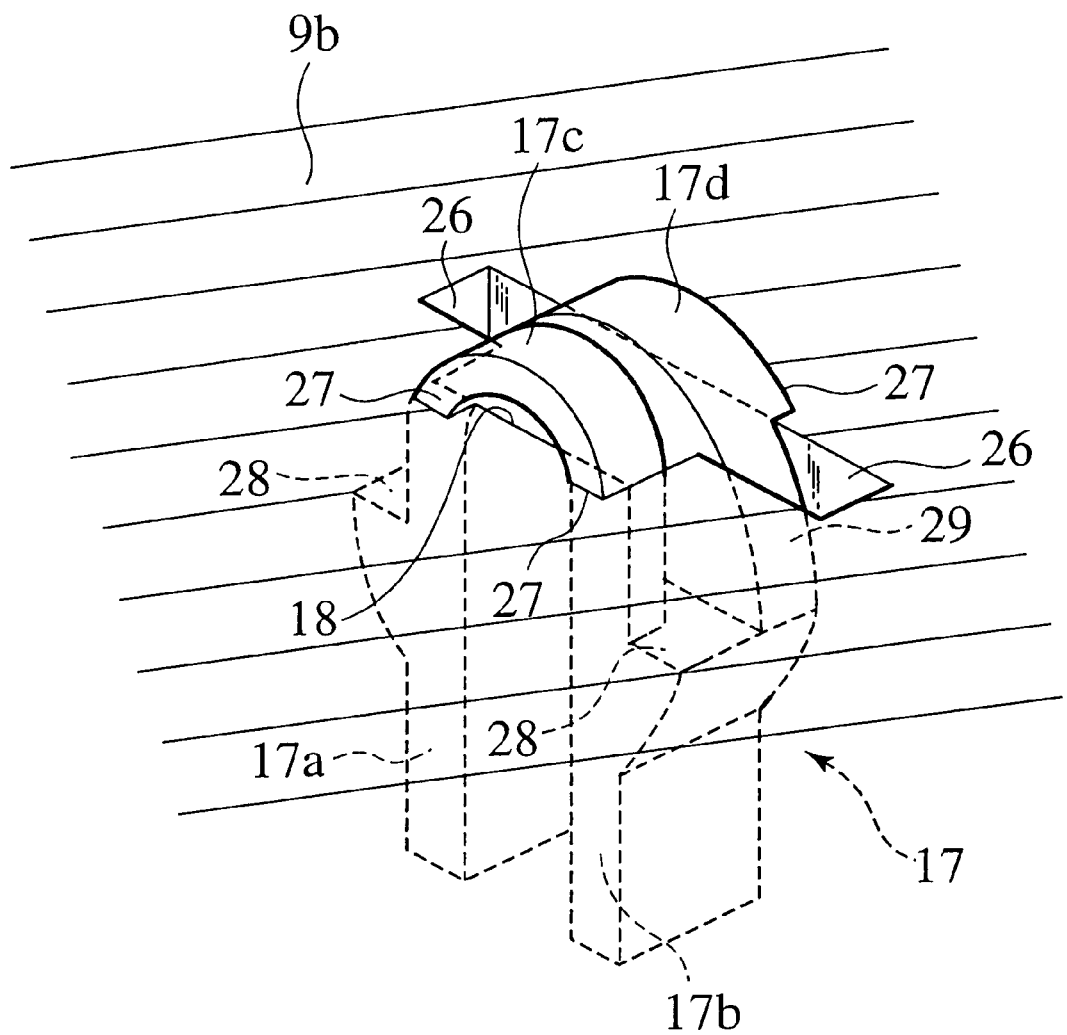
FIG. 8 is an enlarged perspective view of major parts of the lock member in a temporary fixing condition.

As shown in FIGS. 6 to 9, the lock member 17 is so constructed in the shape of an inverted-U letter that the front end side portion, which invades into the lock member insertion hole 18, is extended in the width direction and formed as protrusions 17c, 17d having a pair of leg portions 17a, 17b. The front end side portion shaped in roundness of the lock member 17 has temporary fixing pawls 27, 27 in the width direction thereof, said temporary fixing pawls being to be fixed to the opening peripheral portion of the lock member insertion hole in the bracket opposing face 9b as shown in FIG. 8. The lock member 17 has the step portions 28, 28 for preventing the lock member 17 from invading into the lock member insertion hole 18 by engaging with the cover mounting face 9a when the temporary fixing pawls 27, 27 are fixed to the opening peripheral portion of the lock member insertion hole, so that the cover 10 is fixed to the visor side bracket 9 temporarily.

The lock member 17 has the temporary fixing release portion 29, which comes into contact with the temporary fixing release protrusions 24, 24 passing through the release protrusion insertion holes 26, 26 when the cover 10 fixed to the visor side bracket 9 temporarily is pushed into the panel side bracket 5.

The lock member 17 is elastically deformable and can be set in a temporary fixing condition or complete fixing condition, which will be described later.

Installation Method of the Sun Visor

Installation of the sun visor using the mounting bracket 1 having such a structure onto a vehicle body is carried out as follows. First, as shown in FIG. 5, the panel side bracket 5 is mounted on the roof trim 7. That is, the panel side bracket 5 is mounted on the roof trim 7 such that the trim fixing pawls 23, 23 are set on a rear face of the panel side bracket 5 through the opening 22 formed in the roof trim 7 and the trim fixing pawls 23, 23 are hooked on the opening peripheral portion so as to cover the opening 22. Then, the roof trim 7, on which the panel side bracket 5 is mounted, is fixed to the inner panel 2.

Figure 10:
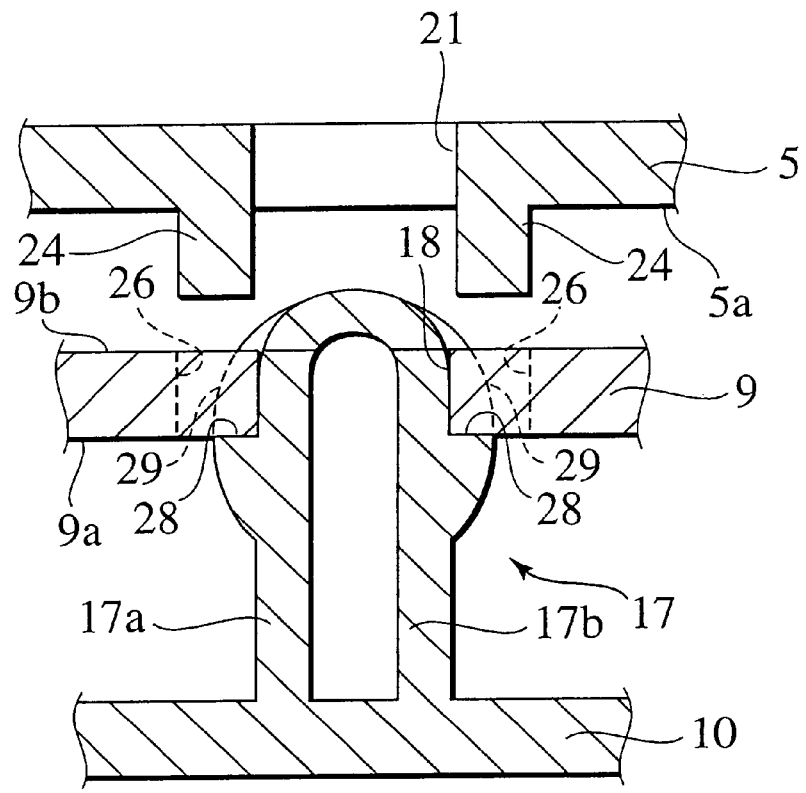
FIG. 10 is a sectional view of the lock member in the temporary fixing condition.

Next, as shown in FIGS. 8, 10, the cover 10 is fixed to the visor side bracket 9 temporarily. That is, the grommet screw protrusions 11, 11 formed on the cover 10 are inserted into the center hole 15 in each of the grommet screws 8, 8 and the front end side portion of the lock member 17 is inserted into the lock member insertion hole 18, so that it faces the bracket opposing face 9b and then, the temporary fixing pawls 27, 27 are fixed to the opening peripheral portion of the lock member insertion hole. In this condition, the grommet screw protrusions 11, 11 and the grommet screws 8, 8 specify the attitudes of the cover 10 and visor side bracket 9 in terms of the direction thereof, interval and the like when the lock member 17 is fixed temporarily.

As a result, the cover 10 is positioned relative to the visor side bracket 9 so that it is fixed temporarily. As a result, the visor side bracket 9 and the cover 10 act as a module. If the cover 10 is fixed to the visor side bracket 9 temporarily when it is shipped to manufacturer, it can be handled as a single part, thereby making it possible to reduce the number of shipped part items.

When the cover 10 is fixed to the visor side bracket 9 temporarily, as shown in FIG. 10, the step portions 28, 28 of the lock member 17 come into contact with the cover mounting face 9a of the visor side bracket 9, thereby preventing the lock member 17 from invading further from a condition of FIG. 10 into the lock member insertion hole 18. Releasing of the lock member 17 is also prevented by friction resistance of interface between the protrusion 17c and the lock member insertion hole 18 caused by elastic force of the lock member 17. In the temporary fixing condition, the lock member 17 is locked in terms of both insertion direction and release direction relative to the lock member insertion hole 18. That is, the lock member 17 is in a condition not allowing itself to be inserted or released.

Next, the visor side bracket 9, on which the cover 10 is fixed temporarily, is pushed into the panel side bracket 5. That is, the female connector 6 provided on the visor side bracket 9 is positioned on the male connector portion 4 of the panel side bracket 5 and the grommet screws 8, 8 are inserted into the circular holes 20, 20 in the panel side bracket 5. At the same time, the shaft fixing portion 12 is made to face the escaping hole 21 and the cover 10 is pushed toward the panel side bracket 5.

Figure 9:
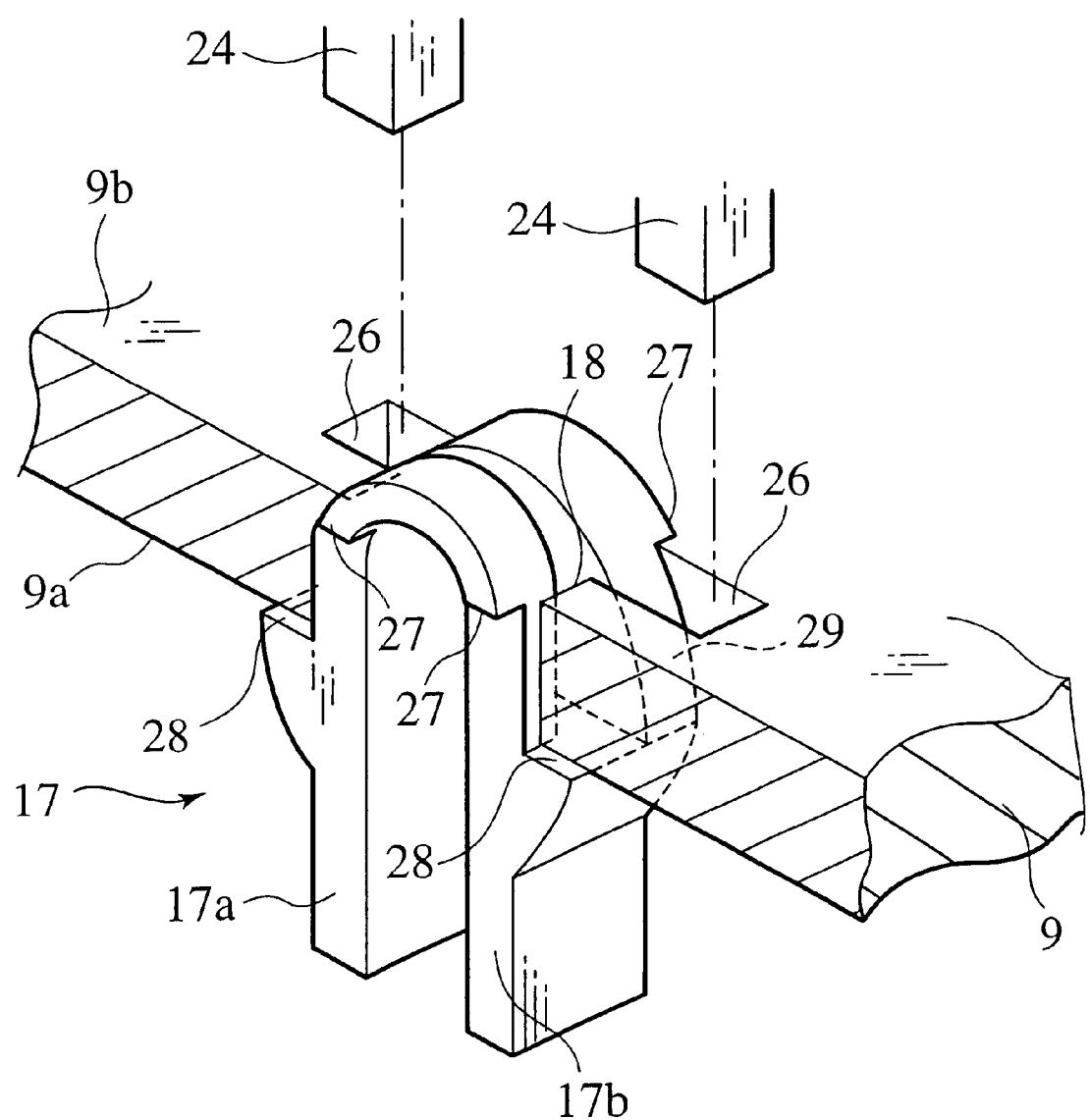
FIG. 9 is a partially broken, enlarged perspective view of major parts of the lock member in a temporary fixing condition.
Figure 11:
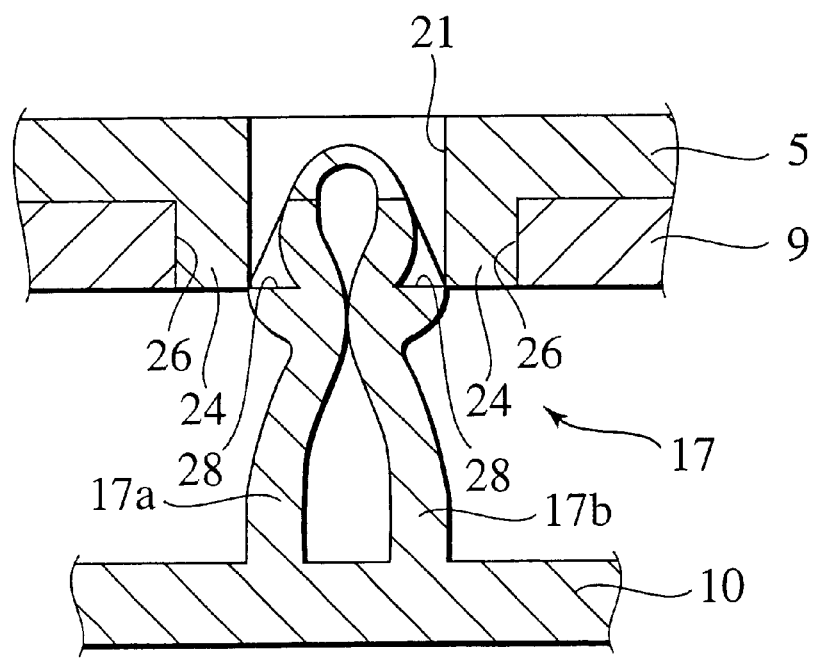
FIG. 11 is a sectional view showing a condition in which a front end side portion of the lock member is crushed by a temporary fixing releasing protrusion when a cover is pushed into a panel side bracket.

Consequently, as shown in FIGS. 9, 10, the temporary fixing release protrusions 24, 24 provided on the panel side bracket are inserted into the release protrusion insertion holes 26, 26 formed adjacent the lock member insertion hole 18, so that the temporary fixing release protrusions 24, 24 comes into contact with the temporary fixing release portion 29 of the lock member 17. If the cover 10 is continued to be pushed further from this condition, as shown in FIG. 11, the leg front end portion of the lock member 17 is crushed inward within its elastic range by the temporary fixing release protrusions 24, 24, so that it is deformed. As a result, the step portions 28, 28 are moved inward so as to release engagement between the step portions 28, 28 and the cover mounting face 9a. Additionally, because of the deformation inward, engagement between the temporary fixing pawls 27, 27 and the opening peripheral portion of the lock member insertion hole is also released.

Figure 12:
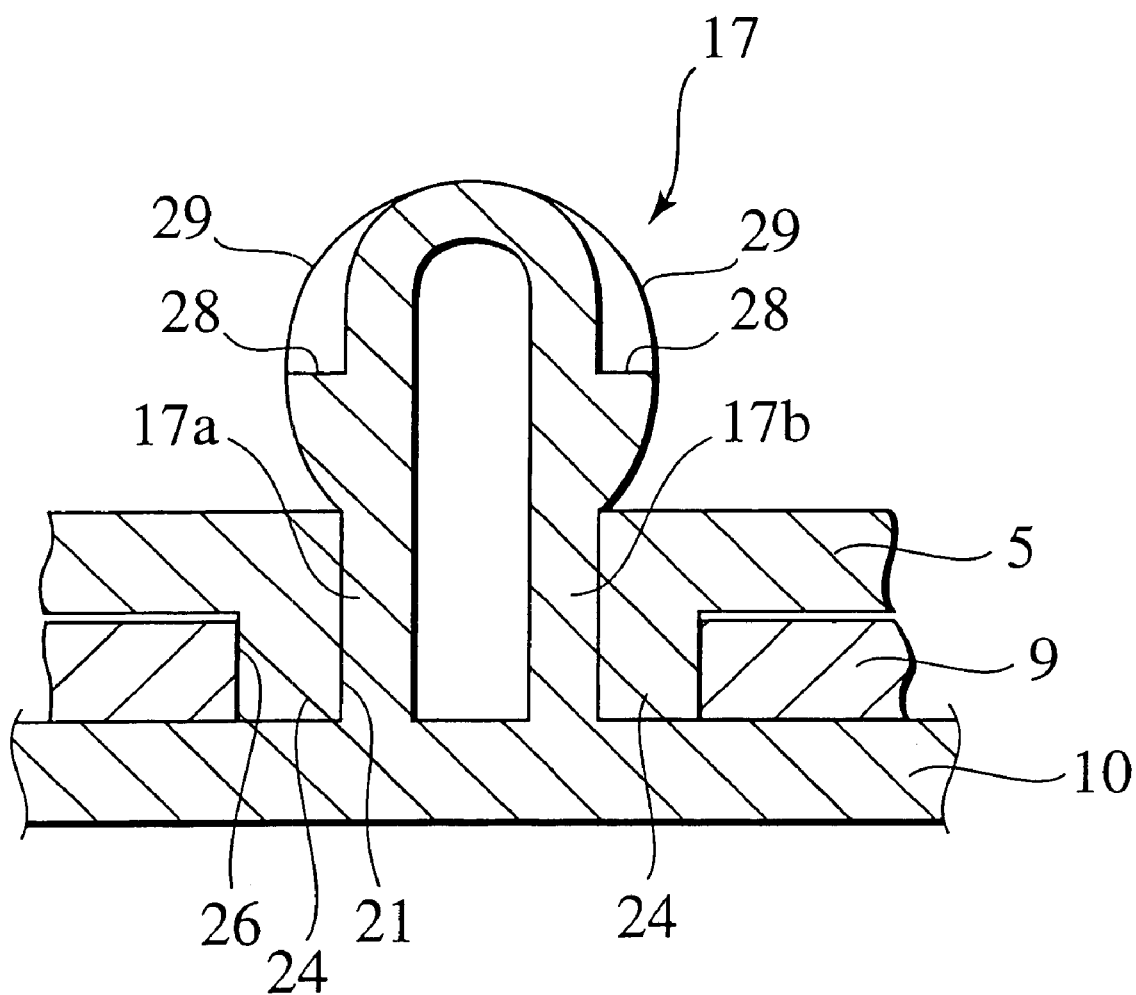
FIG. 12 is a sectional view of the lock member when the bracket is joined together.

If the temporary fixing condition of the cover 10 relative to the visor side bracket 9 is released, as shown in FIG. 12, the lock member 17 entirely invades into the lock member insertion hole 18, so that it is protruded to the side of the inner panel. Then, the front end side portion of the lock member 17 is returned to its initial state because of elastic reformation, so that the front end side portion is fixed to the opening peripheral portion of the escaping hole 21 in the panel side bracket 5.

On the other hand, the grommet screw protrusions 11, 11 invade into the center hole 15 of each of the grommet screws 8, 8 so as to expand the front end of each of the grommet screws 8, 8. Then, the front end portions of the expanded grommet screws 8, 8 are fixed to the opening peripheral portion of the bracket mounting holes formed in the inner panel. At the same time, the female connector portion 6 provided on the visor side bracket 9 is joined to the male connector portion 4 provided on the panel side bracket 5, so that the mounting bracket 1 is fixed to the inner panel 2.

By pushing the cover 10 fixed to the visor side bracket 9 temporarily serving as a module into the panel side bracket 5 by a single action, the bracket 1 can be fixed easily and securely onto the inner panel 2.

Because the cover 10 cannot be pushed further from the temporary fixing position unless the male connector portion 4 is engaged with the female connector portion 6, it is possible to detect erroneous and/or insufficient engagement between the connectors 4 and 6. Further, screws for fixing the bracket become unnecessary and therefore screw tightening work also becomes unnecessary, thereby making it possible to reduce the quantity of parts and number of production steps.

Although a specific embodiment of the present invention has been described above, the present invention is not restricted to the above described embodiment and may be modified in various ways. Although according to the above described embodiment, the sun visor is an accessory to which the present invention can be applied, the accessory referred to by the present invention is not restricted to the sun visor.

What is claimed is:

1. A bracket for mounting an accessory on a panel of a vehicle body, comprising:
    a first bracket having a first connector;
    a second bracket having a second connector and grommet screws, said second connector being joined to said first bracket so as to be connected to said first connector, each of said grommet screws having a cylindrical configuration with a center hole and being inserted into a bracket mounting hole formed in said panel so that said second bracket is fixed to said panel; and
    a cover for joining said first bracket with said second bracket, said cover having a plurality of protrusions each inserted into said center hole of each of the grommet screws so that said cover is mounted on said second bracket from a side opposite to a side facing said first bracket, said protrusion inserted into said center hole expanding a front end of each grommet screw so that said front end is fixed to an opening peripheral portion of said bracket mounting hole, wherein
    a lock member having temporary fixing pawls for fixing said cover onto said second bracket temporarily is formed on said cover; a lock member insertion hole for making a front end side portion of said lock member face a bracket opposing face on an opposite side to said cover mounting face is formed in said second bracket; and said temporary fixing pawls are fixed to an opening peripheral portion of said lock member insertion hole in said bracket opposing face so that said cover is fixed to said second bracket temporarily.

2. A bracket for mounting an accessory on a vehicle body according to claim 1 wherein said lock member has step portions, said step portions being in contact with said cover mounting face of said second bracket when said cover is fixed temporarily, preventing an invasion of said lock member into said lock member insertion hole.

3. A bracket for mounting an accessory on a vehicle body according to claim 2 wherein said lock member has a temporary fixing release portion;
    said first bracket has temporary fixing release protrusions; and
    when said cover fixed to said second bracket temporarily is pushed into said first bracket, said temporary fixing release protrusions press said temporary fixing release portion inserted through said lock member insertion hole so that said lock member is crushed within an elastic range thereof thereby an engagement between said step portions and said cover mounting face being released.

4. A bracket for mounting an accessory on a vehicle body according to claim 3 wherein said first bracket is fixed to said auxiliary panel temporarily and joined to said second bracket on which said cover is fixed temporarily, so that said connector and said second connector are joined together.

5. A bracket for mounting an accessory on a vehicle body according to claim 4 wherein:
    said first bracket has an escaping hole for allowing said lock member to pass through; and
    a front end side portion of said lock member protruded to the side of said bracket opposing face is elastically restored and returned to an initial state so that it is fixed to an opening peripheral portion of said escaping hole.

6. An assembly for fixing an article to a body, comprising:
    a first holding member mountable to the body;
    a second holding member including means for fixing said article to said second holding member and having a lock member insertion hole; and
    a third holding member including means for joining said first holding member to said second holding member and mountable to said second holding member on a mounting face opposite to a side facing said first holding member, said third holding member including a lock member insertable into said lock member insertion hole, the lock member having temporary fixing pawls receivable in a peripheral portion of said lock member insertion hole for temporarily fixing said third holding member to said second holding member prior to engagement with said first holding member, wherein a front end portion of said lock member protrudes out of said lock member insertion hole to face said first holding member.

7. An assembly for fixing an article according to claim 6 wherein said lock member has step portions in contact with said mounting face of said second holding member when said third holding member is fixed temporarily, preventing said lock member from fully invading into said lock member insertion hole.

8. An assembly for fixing an article according to claim 7 wherein:
    said lock member is elastically deformable and has a temporary fixing release portion;
    said first holding member has temporary fixing release protrusions; and
    when said third holding member temporarily fixed to said second holding member is pushed into said first holding member, said temporary fixing release protrusions press said temporary fixing release portion inserted through said lock member insertion hole so that said lock member is deformed within an elastic range thereof thereby releasing an engagement between said step portions and said mounting face.

9. An assembly for fixing an article according to claim 8 wherein:
    said first holding member has a first connector;
    said second holding member has a second connector; and
    said first holding member is temporarily fixed to said article and joined to said second holding member on which said third holding member is fixed temporarily, so that said first connector and said second connector are joined together.

10. An assembly for fixing an article according to claim 9 wherein:
    said first holding member has an escaping hole for allowing said lock member to pass through; and
    said front end portion of said lock member protruded out of said lock member insertion hole is elastically restored to an initial state and is fixed to an opening peripheral portion of said escaping hole.

11. An assembly for fixing an article according to claim 6 wherein:

said second holding member has a first fixing member, said third holding member has a second fixing member, and when said third holding member is fixed to said second holding member temporarily, said first fixing member and said second fixing member interfere with each other so as to maintain a predetermined position.

12. A lock member for article fixing means, wherein said fixing means includes a first holding member, a second holding member, and a third holding member including means for joining said first holding member and said second holding member and being configured to be temporarily fixed to said second holding member on a mounting face opposite to a side facing said first holding, said lock member comprising:

temporary fixing pawls receivable in a peripheral portion of a lock member insertion hole formed in said second holding member for fixing said third holding member to said second holding member; and step portions being in contact with said mounting face of said second holding member when said third holding member is temporarily fixed to said second holding member so as to prevent said lock member from fully invading into said lock member insertion hole, whereby in a temporary fixing condition, a front end portion of said lock member protrudes out of said lock member insertion hole to face a first holding member, and said temporary fixing pawls is fixed to an opening peripheral portion of said lock member insertion hole so that said third holding member is fixed to said second holding member temporarily.

13. A lock member for article fixing means according to claim 12 wherein:

said lock member is elastically deformable and has a temporary fixing release portion;

said first holding member has temporary fixing release protrusions; and when said third holding member temporarily fixed to said second holding member is pushed into said first holding member, said temporary fixing release protrusions press said temporary fixing release portion inserted through said lock member insertion hole so that said lock member is deformed within an elastic range thereof, thereby releasing an engagement between said step portions and said third holding member mounting face.

* * * * *

UNITED STATES PATENT AND TRADEMARK OFFICE
CERTIFICATE OF CORRECTION

PATENT NO.     : 6,511,029 B2
DATED          : January 28, 2003
INVENTOR(S)    : Masahiro Sawayanagi It is certified that error appears in the above-identified patent and that said Letters Patent is hereby corrected as shown below:

<u>Title page,</u>
Item [57], ABSTRACT,
Line 1, before "This mounting", insert -- This invention intends to provide a bracket for mounting an accessory to a vehicle body capable of simplifying installation work and eliminating connector coupling failure. --.
Line 2, after "panel", delete "of a vehicle body".

<u>Column 9,</u>
Line 17, after "first holding", insert -- member --.

<u>Column 10,</u>
Line 5, "pawls is" should read -- pawls are --.

Signed and Sealed this

Second Day of September, 2003

JAMES E. ROGAN
*Director of the United States Patent and Trademark Office*